(12) United States Patent
Totsuka

(10) Patent No.: US 10,430,974 B2
(45) Date of Patent: Oct. 1, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Atsushi Totsuka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 15/791,048

(22) Filed: Oct. 23, 2017

(65) Prior Publication Data
US 2018/0122100 A1    May 3, 2018

(30) Foreign Application Priority Data

Oct. 28, 2016  (JP) ................................. 2016-211899
Jul. 20, 2017  (JP) ................................. 2017-140764

(51) Int. Cl.
*G06K 9/00* (2006.01)
*G06T 7/00* (2017.01)
(Continued)

(52) U.S. Cl.
CPC .................. *G06T 7/97* (2017.01); *G06T 7/40* (2013.01); *H04N 1/387* (2013.01); *H04N 1/54* (2013.01);
(Continued)

(58) Field of Classification Search
CPC ... G06T 7/97; G06T 7/40; H04N 1/58; H04N 1/54; H04N 1/387; G03G 15/04027; G03G 15/6585; G06K 15/1276
See application file for complete search history.

(56) References Cited

U.S. PATENT DOCUMENTS 8,267,498 B1 * 9/2012 Blair ........................ H04N 1/54
                                                                    347/19
9,706,083 B2 * 7/2017 Totsuka ................... H04N 1/52
(Continued)

FOREIGN PATENT DOCUMENTS

JP         3555420 B2    8/2004
JP      2013-091225 A    5/2013
(Continued)

*Primary Examiner* — Aaron W Carter
(74) *Attorney, Agent, or Firm* — Canon USA, Inc., IP Division

(57) ABSTRACT

An image processing apparatus for generating data for overlappingly forming a first image including a boundary between a plurality of areas representing different gloss characteristics and a second image having a plurality of areas including a plurality of pixels, on a recording medium includes an acquisition unit configured to acquire first image data representing gloss characteristics of the first image and second image data representing color characteristics of the second image, and a conversion unit configured to convert colors represented by respective pixels of the areas in the second image into one color out of the colors represented by the respective pixels of the areas, based on the first image data, in which the areas in the second image correspond to areas obtained by dividing the first image into a plurality of areas, and include a part of the area corresponding to the boundary in the second image.

18 Claims, 11 Drawing Sheets

(51) Int. Cl.
 *G06T 7/40* (2017.01)
 *H04N 1/387* (2006.01)
 *H04N 1/54* (2006.01)
 *H04N 1/58* (2006.01)
 *G03G 15/00* (2006.01)
 *G03G 15/04* (2006.01)

(52) U.S. Cl.
 CPC ......... *H04N 1/58* (2013.01); *G03G 15/04027* (2013.01); *G03G 15/6585* (2013.01)

(56) References Cited

U.S. PATENT DOCUMENTS

| | | | | |
|---|---|---|---|---|
| 10,265,969 B2* | 4/2019 | Totsuka | ............... | B41J 11/0015 |
| 2008/0193860 A1* | 8/2008 | Hains | ................. | G03G 15/0115 |
| | | | | 430/5 |
| 2010/0315458 A1* | 12/2010 | Kato | ...................... | B41J 2/2107 |
| | | | | 347/15 |
| 2012/0056937 A1* | 3/2012 | Kagata | .................. | B41J 2/2107 |
| | | | | 347/43 |
| 2012/0212754 A1* | 8/2012 | Hirata | ................... | B41J 2/2114 |
| | | | | 358/1.9 |
| 2013/0100186 A1* | 4/2013 | Kumagai | ............... | B41J 2/2117 |
| | | | | 347/9 |
| 2013/0120801 A1* | 5/2013 | Shibasaki | ............ | H04N 1/6022 |
| | | | | 358/3.24 |
| 2013/0128291 A1* | 5/2013 | Shibasaki | ................ | H04N 1/54 |
| | | | | 358/1.9 |
| 2013/0201501 A1* | 8/2013 | Nishikawa | ......... | G03G 15/0126 |
| | | | | 358/1.9 |
| 2014/0267653 A1* | 9/2014 | Richardson | ............ | H04N 5/357 |
| | | | | 348/65 |
| 2016/0267365 A1* | 9/2016 | Totsuka | ................... | H04N 1/52 |
| 2017/0006186 A1* | 1/2017 | Yanai | ...................... | H04N 1/54 |
| 2017/0013172 A1* | 1/2017 | Shibasaki | ................ | H04N 1/54 |
| 2017/0210145 A1* | 7/2017 | Kubo | ......................... | B41J 2/01 |
| 2017/0289403 A1* | 10/2017 | Totsuka | ................... | H04N 1/52 |
| 2018/0004074 A1* | 1/2018 | Kubo | .................... | G03B 21/208 |
| 2018/0029384 A1* | 2/2018 | Totsuka | ............... | B41J 11/0015 |
| 2018/0063379 A1* | 3/2018 | Manabe | ................ | G06T 11/001 |
| 2018/0086113 A1* | 3/2018 | Oya | ....................... | B41J 11/0015 |
| 2018/0122100 A1* | 5/2018 | Totsuka | ................. | H04N 1/387 |
| 2018/0345680 A1* | 12/2018 | Ishii | ......................... | B41J 2/2056 |
| 2018/0370246 A1* | 12/2018 | Totsuka | .................. | B41J 2/2135 |
| 2018/0370255 A1* | 12/2018 | Kubo | ......................... | B41J 3/4073 |
| 2019/0037085 A1* | 1/2019 | Inaba | ................. | H04N 1/00267 |
| 2019/0080479 A1* | 3/2019 | Totsuka | ..................... | B41J 2/01 |

FOREIGN PATENT DOCUMENTS

| | | |
|---|---|---|
| JP | 2013-235517 A | 11/2013 |
| JP | 2016-519592 A | 7/2016 |

\* cited by examiner

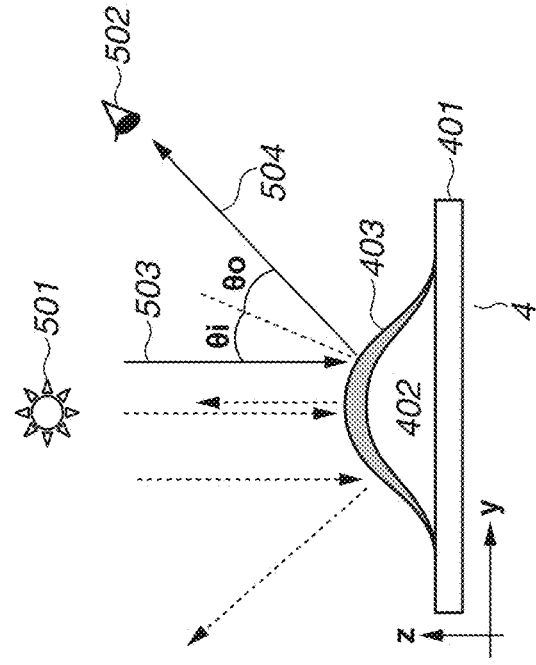
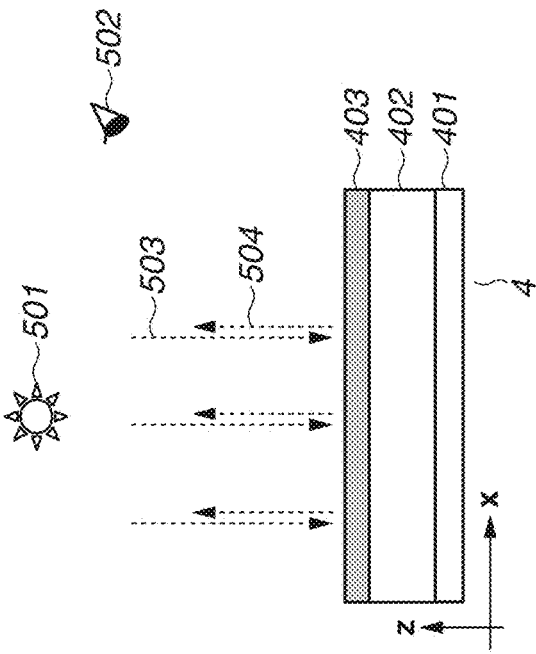

FIG.8
| 801<br>AZIMUTH ANGLE | 802<br>DOT ARRANGEMENTS OF CLEAR INK | 803<br>NUMBER OF LAYERS TO BE STACKED |
|---|---|---|
| 0 |  | 4 |
| ⋮ | ⋮ | ⋮ |
| 45 |  | 4 |
| ⋮ | ⋮ | ⋮ |
| 90 | 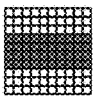 | 4 |
| ⋮ | ⋮ | ⋮ |

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, a storage medium, and an image processing technique for overlapping a color material layer and a gloss layer on a recording medium.

Description of the Related Art

In recent years, there has been an increase in the use of printers capable of controlling the gloss characteristics as well as the color characteristics by controlling fine uneven shapes on the surface of a recording medium as in the case of an image using a lenticular lens. Japanese Patent No. 3555420 discusses a technique for synchronizing the timing of discharging ink for forming an image and a lenticular lens to be overlapped on the image by using an ink-jet printer. Such a printer is capable of controlling the color and the gloss characteristics by overlappingly forming a color material layer (formed by color ink) and a gloss layer (formed by glossy ink) on a recording medium. In this case, since such uneven shapes that a lenticular lens has are formed of a plurality of dots, the resolution for controlling the gloss characteristics (hereinafter referred to as a gloss characteristic control resolution) is lower than the resolution for controlling the color characteristics (hereinafter referred to as a color characteristic control resolution).

On an image formed by overlapping a color material layer and a gloss layer, the above-described difference between the color characteristic control resolution and the gloss characteristic control resolution causes mismatching between the boundary between areas representing different gloss characteristics and the boundary between areas representing different colors, possibly resulting in image quality degradation. Therefore, the above-described image formed by overlapping a color material layer and a gloss layer involves image processing in consideration of the difference between the color characteristic control resolution and the gloss characteristic control resolution. However, the technique discussed in Japanese Patent No. 3555420 and known techniques do not take into consideration the difference between the above-described control resolutions.

SUMMARY

The present disclosure is directed to offering processing for reducing image quality degradation due to the mismatching between the boundary between areas representing different gloss characteristics and the boundary between areas representing different color characteristics in an image formed by overlapping a color material layer and a gloss layer.

According to one or more aspects of the present disclosure, an image processing apparatus for generating data for overlappingly forming a first image including a boundary between a plurality of areas representing different gloss characteristics and a second image having a plurality of areas including a plurality of pixels, on a recording medium includes an acquisition unit configured to acquire first image data representing gloss characteristics of the first image and second image data representing color characteristics of the second image, and a conversion unit configured to convert colors represented by respective pixels of the areas in the second image into one color out of the colors represented by the respective pixels of the areas, based on the first image data. The areas in the second image correspond to areas obtained by dividing the first image into a plurality of areas, and include a part of the area corresponding to the boundary in the second image.

Further features of the present disclosure will become apparent from the following description of exemplary embodiments with reference to the attached drawings.

BRIEF DESCRIPTION OF THE DRAWINGS

FIGS. 5A and 5B illustrate light reflective characteristics of an image formed on a recording medium according to one or more aspects of the present disclosure.

FIG. 8 illustrates a look-up table (LUT) for obtaining shape data from gloss characteristic values according to one or more aspects of the present disclosure.

DESCRIPTION OF THE EMBODIMENTS

One or more aspects of the present disclosure will be described below with reference to the accompanying drawings.

<Hardware Configuration of Image Processing Apparatus 1>

Figure 1:
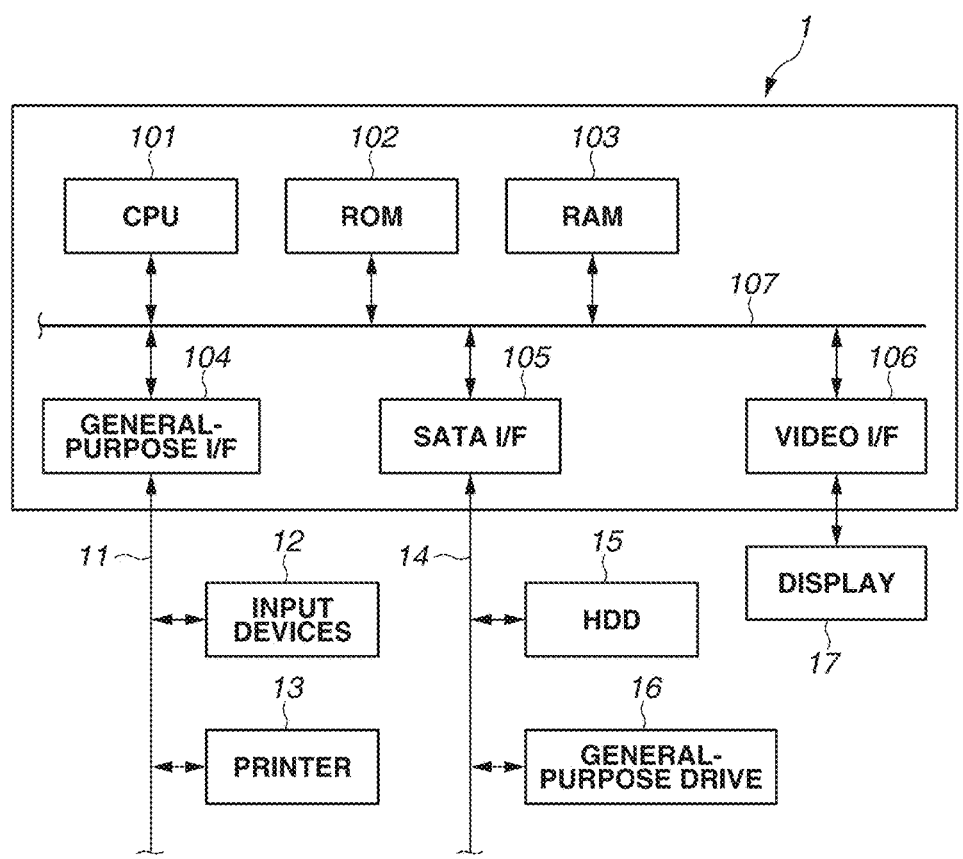
FIG. 1 is a block diagram illustrating a hardware configuration of an image processing apparatus according to one or more aspects of the present disclosure.

FIG. 1 illustrates an example of a hardware configuration of an image processing apparatus 1 according to a first exemplary embodiment. The image processing apparatus 1 is, for example, a computer which includes a central processing unit (CPU) 101, a read only memory (ROM) 102, and a random access memory (RAM) 103. The CPU 101 executes an operating system (OS) and various programs stored in the ROM 102 and a hard disk drive (HDD) 15 by using the RAM 103 as a work memory. The CPU 101, which may include one or more processors and one or more memories, also controls each component via a system bus 107. Processing in flowcharts (described below) is implemented when the CPU 101 loads a program code stored in the ROM 102 and HDD 15 into the RAM 103 and then executes it. The general-purpose interface (I/F) 104 is connected with input devices 12, such as a mouse and a keyboard, and a printer 13 via a serial bus 11. A serial ATA (SATA) I/F 105 is connected with a general-purpose drive 16 for writing and reading data to/from the HDD 15 and various recording media via a serial bus 14. The CPU 101 uses various recording media mounted on the HDD 15 and the general-purpose drive 16 as a storage location of various types of data. A video I/F 106 is connected with a display 17. The CPU 101 displays a user interface (UI) offered by a program on the display 17 and receives an input such as a user instruction received via the input devices 12.

<Functional Configuration of Image Processing Apparatus 1>

Figure 2:
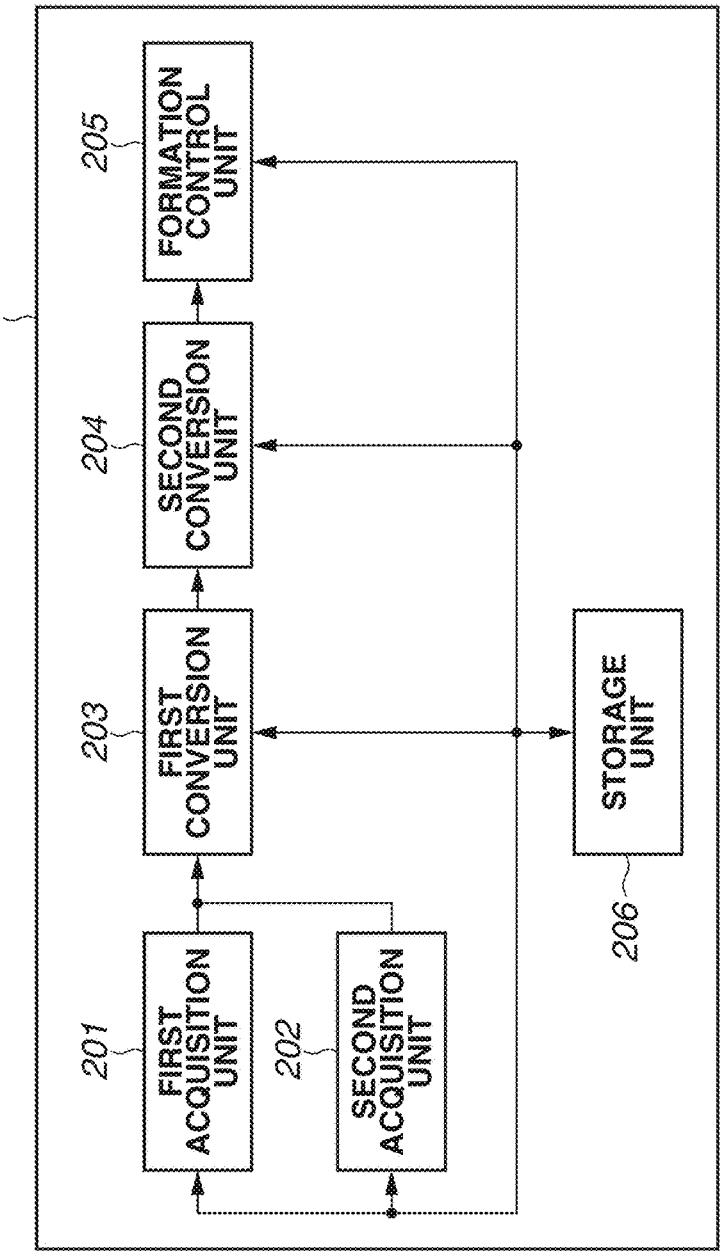
FIG. 2 is a block diagram illustrating a functional configuration of the image processing apparatus according to one or more aspects of the present disclosure.

FIG. 2 is a block diagram illustrating a functional configuration of the image processing apparatus 1 according to the present exemplary embodiment. Processing content performed by an image processing application included in the above-described various programs based on an instruction from the CPU 101 will be described below with reference to FIG. 2. The image processing apparatus 1 includes a first acquisition unit 201, a second acquisition unit 202, a first conversion unit 203, a second conversion unit 204, a formation control unit 205, and a storage unit 206. The first acquisition unit 201 acquires image data specified via the general-purpose I/F 104 from the HDD 15 and various recording media mounted on the general-purpose drive 16. The first acquisition unit 201 according to the present exemplary embodiment acquires two different types of image data: color image data in which the color characteristics is recorded in each pixel, and gloss image data in which the gloss characteristics are recorded in each pixel. The second acquisition unit 202 acquires the control resolution of the printer for forming a color image (color material layer) represented by color image data and a glossy image (gloss layer) represented by gloss image data on a recording medium. The second acquisition unit 202 according to the present exemplary embodiment acquires two different control resolutions, the resolution for controlling the color characteristics (hereinafter referred to as a color characteristics control resolution) and the resolution for controlling the gloss characteristics (hereinafter referred to as a gloss characteristics control resolution). The first conversion unit 203 converts the resolution of the image data acquired by the first acquisition unit 201. The second conversion unit 204 refers to the gloss image data and converts the color in areas in the color image data. The formation control unit 205 controls the printer 13 to form a color material layer and a gloss layer on a recording medium. The storage unit 206 prestores such information as the characteristic values of each ink mounted on the printer 13. Processing operations of each unit will be described in detail below.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

<Configuration and Operations of Printer 13>

Figure 3:
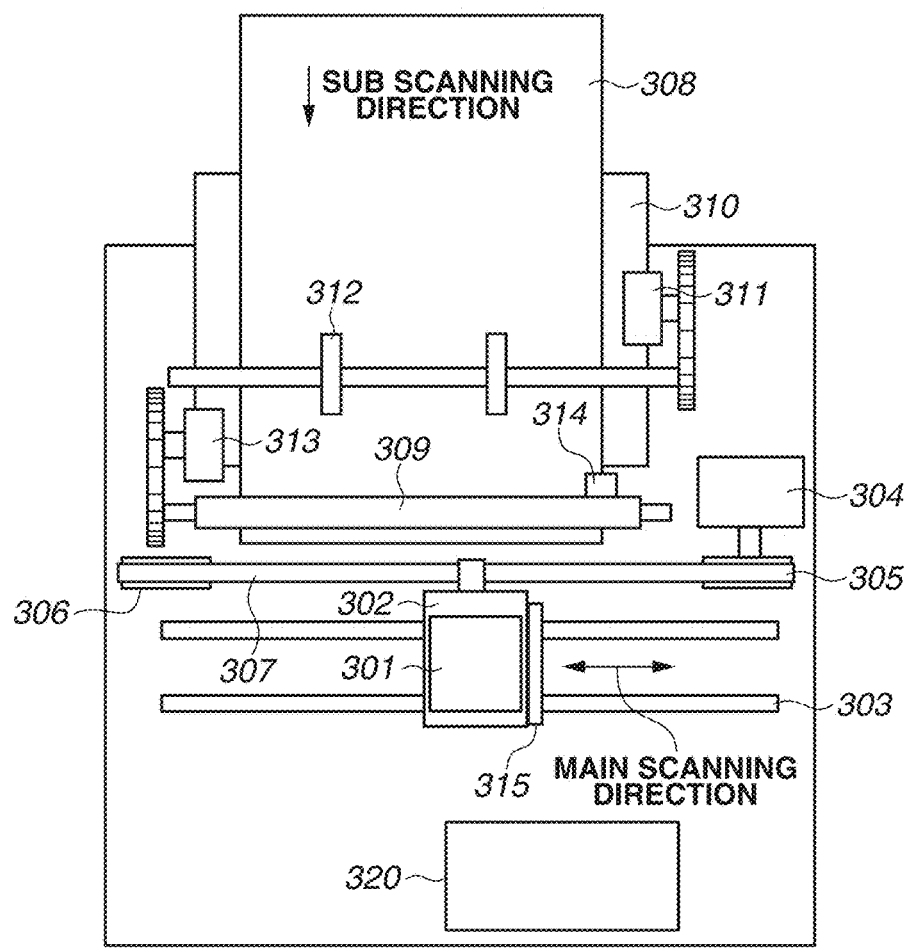
FIG. 3 illustrates a configuration of a printer according to one or more aspects of the present disclosure.

FIG. 3 illustrates a configuration of the printer 13 for forming a color material layer and a gloss layer on a recording medium based on data generated by the image processing apparatus 1. According to the present exemplary embodiment, an ultraviolet-curing ink-jet printer called an ultraviolet (UV) ink-jet is used. A head cartridge 301 is provided with a recording head having a plurality of discharge ports, an ink tank for supplying ink to the recording head, and a connector for receiving a signal for driving each discharge port of the recording head. The ink tank stores UV-curing ink for forming a color material layer and a gloss layer. The head cartridge 301 and an UV lamp 315 are exchangeably mounted on a carriage 302. The carriage 302 is provided with a connector holder for transmitting a drive signal to the head cartridge 301 via the connector. The carriage 302 is configured to be reciprocally movable along with a guide shaft 303. Specifically, the carriage 302 is driven by a main scanning motor 304 as a drive source via drive mechanisms such as a motor pulley 305, a driven pulley 306, and a timing belt 307, and the position and movement of the carriage 302 are controlled. According to the present exemplary embodiment, the movement of the carriage 302 along the guide shaft 303 is referred to as "main scanning", and the moving direction is referred to as the "main scanning direction". A recording medium 308 for printing is placed on an automatic sheet feeder (ASF) 310. When forming an image on the recording medium 308, a pickup roller 312 is rotated by the drive of a feed motor 311, and the recording media 308 are separated and fed one by one from the ASF 310. Then, the recording medium 308 is conveyed to the recording start position facing the discharge port surface of the head cartridge 301 on the carriage 302 by the rotation of the conveyance roller 309. The conveyance roller 309 is driven by a line feed motor 313 as a drive source via a gear. The CPU 101 determines whether the recording medium 308 has been supplied and settles the feed time position when the recording medium 308 has passed through a sensor 314. The head cartridge 301 mounted on the carriage 302 is held so that the discharge port surface downwardly protrudes from the carriage 302 and becomes in parallel with the recording medium 308. A control unit 320 including the CPU 101 and a storage unit receives data from the outside and controls operations of each part based on the data. The data refers to colored ink (color ink) dot arrangement data and output shape data (data representing the dot arrangements and the number of stacked layers of the clear ink) generated via processing (described below).

The following describes operations performed by each part (controlled by the control unit 320) to form a color material layer and a gloss layer. First of all, to form a gloss layer, the recording medium 308 is conveyed to the recording start position, and the carriage 302 moves along with the guide shaft 303 above the recording medium 308. During the movement of the carriage 302, UV-curing ink (clear ink) is discharged from the discharge port of the recording head. Immediately after the ink discharge, the UV lamp 315 lights up to cure ink. When the carriage 302 moves to one end of the guide shaft 303, the conveyance roller 309 conveys the recording medium 308 by a predetermined amount in the direction perpendicular to the scanning direction of the carriage 302. According to the present exemplary embodiment, the conveyance of the recording medium 308 is referred to as "paper feed" or "sub scanning", and the conveyance direction is referred to as the "paper feed direction" or "sub scanning direction". When the recording medium 308 has been conveyed by a predetermined amount in the sub scanning direction, the carriage 302 moves again along with the guide shaft 303. Repeating the scanning by the carriage 302 of the recording head enables stacking a layer of UV-curing ink on the recording medium 308. When the control unit 320 alternately repeats the stacking of the clear ink layer and the paper feed, fine uneven shapes for controlling the gloss characteristics are formed on the entire surface of the recording medium 308. A layer having such fine uneven shapes is referred to as a gloss layer. After a gloss layer is formed, the conveyance roller 309 returns the recording medium 308 to the recording start position and each color ink (cyan, magenta, yellow, and black (CMYK) ink) on the upper layer of the gloss layer is discharged in a process similar to the gloss layer forming, so that a color material layer is formed. The printer 13 is not limited to the above-described operations and recording method as long as the printer 13 is capable of forming a color material layer for controlling the color characteristics and a gloss layer for controlling the gloss characteristics.

<Print Products Formed by Printer 13>

Figure 4A:
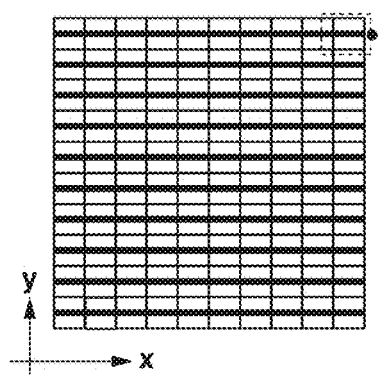
FIGS. 4A, 4B, 4C, and 4D are cross-sectional views schematically illustrating an image formed on a recording medium according to one or more aspects of the present disclosure.
Figure 4B:
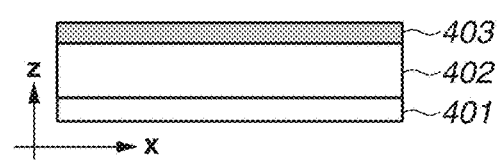
Figure 4C:
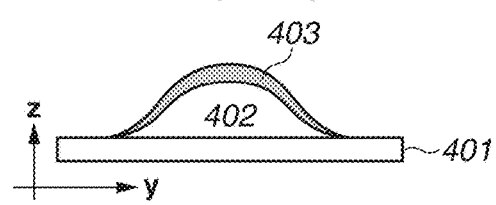
Figure 4D:
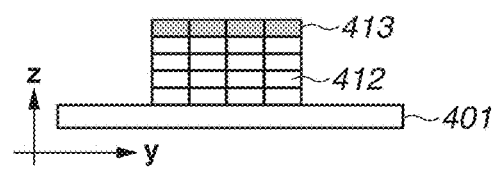

The following describes, with reference to FIGS. 4A to 4D, a print product formed based on data generated through processing by the image processing apparatus 1 according to the present exemplary embodiment and then received by the printer 13. The xy plane formed by the x and y axes is the surface of a printing medium, and the z axis direction is perpendicular to the surface of a printing medium. FIG. 4A is a schematic view illustrating a print product when viewed from the z-axis direction. FIGS. 4B and 4C are cross-sectional views schematically illustrating a part of the area illustrated in FIG. 4A when viewed from the y-axis and the x-axis directions, respectively. FIGS. 4B and 4C illustrate a recording medium 401, clear ink 402, and color ink 403. According to the present exemplary embodiment, fine uneven shapes formed of clear ink 402 are referred to as a gloss layer, and the layer formed of the color ink 403 is referred to as a color material layer. As illustrated in FIG. 4B and FIG. 4C, when uneven shapes are formed of the clear ink 402, the observable normal distribution is different between the x-axis and the y-axis directions. The gloss layer and the color material layer formed of the clear ink 402 and the color ink 403, respectively, can be formed by stacking ink dots, as illustrated in FIG. 4D. A grid 412 indicates one dot of UV clear ink and a grid 413 indicates one dot of cyan ink. FIG. 4D schematically illustrates stacked layers, i.e., four UV clear ink layers and one color ink layer on the top. As illustrated in FIG. 4D, in the process of forming uneven shapes by stacking ink layers, the discharged UV-curing ink wetly spreads in the planar direction of the recording medium 401 during a time period since the ink landing till the curing by UV irradiation. As a result, as illustrated in FIG. 4C, uneven shapes finally formed have a lower frequency than uneven shapes in the data illustrated in FIG. 4D. The following describes the difference in perceived vision of uneven shapes between viewing from the x-axis direction and viewing from the y-axis direction. Hereinafter, the difference in vision of uneven shapes with respect to the observation angle defined on the xy plane is referred to as azimuth angle anisotropy. FIGS. 5A and 5B are schematic views illustrating visions of the above-described uneven shapes when viewed from the y-axis and the x-axis directions, respectively. Referring to FIGS. 5A and 5B, the positions of an illumination 501 and an observer 502 are assumed to be sufficiently apart from a print product. As illustrated in FIGS. 5A and 5B, illumination light enters uneven shapes from the direction forming an angle of 0 degrees with the z-axis direction, and the observer 502 observes the light reflected into the direction forming an angle of 45 degrees with the z-axis direction. In either cases illustrated in FIGS. 5A and 5B, the elevation angle formed by the above-described incidence direction and the z axis and the elevation angle formed by the above-described observation direction and the z axis are identical, and only the azimuth angle on the xy plane is different. As illustrated in FIG. 5A, when the print product is viewed from the y-axis direction, normals formed by fine uneven shapes of the print product are uniformly oriented in the z-axis direction, and a specular reflection component 504 of the reflected light for incidence light 503 is returned to the z-axis direction. Therefore, a small amount of the reflected light is returned in the observation direction, and the cyan color material layer is weakly perceived. On the other hand, as illustrated in FIG. 5B, when the print product is viewed from the x-axis direction, the specular reflection component 504 of the reflected light is returned in the observation direction as drawn by a solid line in some areas because normals formed by fine uneven shapes of the print product are distributed in many directions. Therefore, cyan can be more strongly perceived than in the case where the print product is viewed from the y-axis direction. As described above, forming a print product having the above-described gloss layer and color material layer enables perceiving the azimuth angle anisotropy. Although, in the above-described example, a color material layer is formed of cyan ink, the color material layer may be formed of other color ink or a secondary color combining a plurality of color ink. Uneven shapes formed in the gloss layer are not limited to the above-described shapes as long as they have different normal distributions according to the azimuth angle. For example, uneven shapes may be formed by doubling the number of stacked UV-curing clear ink layers or by rotating the shape data by 90 degrees on the xy plane.

<Input Image Data and Output Image Data>

Figure 6:
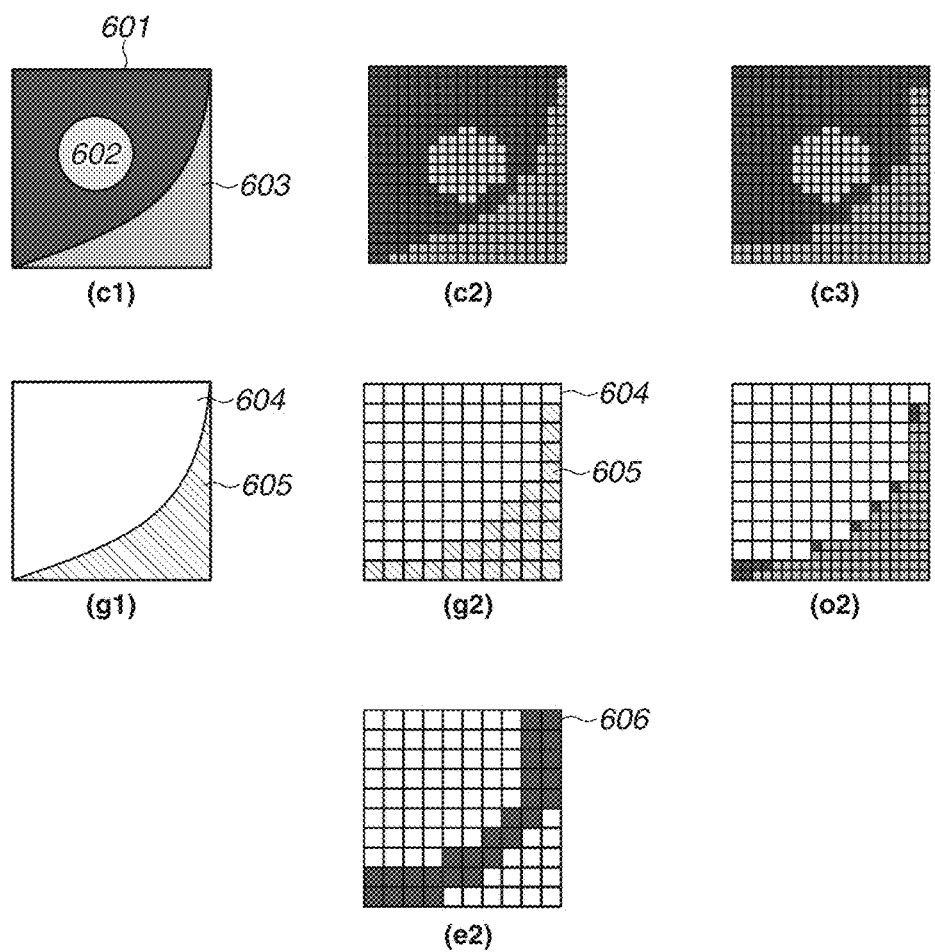
FIG. 6 illustrates gloss image data and color image data according to one or more aspects of the present disclosure.

The following describes input image data acquired by the first acquisition unit 201 and output image data generated via processing performed by the second acquisition unit 202, the first conversion unit 203, and the second conversion unit 204 according to the present exemplary embodiment. The input image data refers to the color image data representing the color characteristics as a reproduction target, and the gloss image data representing the gloss characteristics as a reproduction target. The output image data refers to color ink dot arrangement data converted from the input color image data by known halftone (HT) processing and path decomposition, and the shape data representing uneven shapes for representing on a recording medium the gloss characteristics recorded in the gloss image data. FIG. 6 illustrates examples of input images (c1) and (g1). In the color image data (c1) illustrated in FIG. 6, the red, green, and blue (RGB) values indicating the color characteristics are recorded in each pixel for each channel. In the gloss image data (g1) illustrated in FIG. 6, the azimuth angle providing the maximum reflective intensity of light is stored in each pixel. For example, with the print product illustrated in FIGS. 4A to 4D, strong reflected light is perceived in the y-axis direction as described with reference to FIGS. 5A and 5B. Therefore, the value corresponding to an azimuth angle of 90 degrees indicating the y-axis direction is recorded as a gloss characteristic value. Referring to the input image c1 illustrated in FIG. 6, different RGB values are recorded in areas 601, 602, and 603. Referring to the input image g1 illustrated in FIG. 6, the gloss characteristic values corresponding to azimuth angles of 0 and 90 degrees are recorded in areas 604 and 605, respectively. When a color image represented by the color image data and a gloss image represented by the gloss image data are overlappingly formed on a recording medium, the colors of the areas 601 and 602 arranged in the area corresponding to the area 604 are strongly perceived when viewed from the direction of an azimuth angle of 0 degrees. The color of the area 603 arranged in the area corresponding to the area 605 is weakly perceived. On the other hand, when viewed from the direction of an azimuth angle of 90 degrees, the colors of the areas 601 and 602 arranged in the area corresponding to the area 604 are weakly perceived, and the color of the area 603 arranged in the area corresponding to the area 605 is strongly perceived. When the image data (c1) and (g1) illustrated in FIG. 6 are input image data, the anisotropy of such gloss serves as a reproduction target. FIG. 6 schematically illustrates image data (c2) and (g2) as a result of resampling the input image data (c1) and (g1), respectively, with the maximum control resolution of the printer 13. Each grid in the image data (c2) and (g2) indicates the minimum control unit of each of characteristics. Since fine uneven shapes formed in a gloss layer is formed of a plurality of clear ink dots arranged on the xy plane as described above, the maximum gloss characteristic control resolution is lower than that of the color characteristics controlled by the one-dot ink discharge ON/OFF state. ON indicates that ink is discharged and OFF indicates that ink is not discharged. For example, uneven shapes illustrated in FIGS. 4B to 4D are used as the minimum gloss characteristics control unit, and include convex portions having a 4-dot width and concave portions having a 6-dot width. The uneven shapes are formed by using the printer 13 capable of controlling the ink discharge ON/OFF state with a resolution of 1200 dots per inch (dpi). In this case, the maximum gloss characteristic control resolution is 120 dpi (=1200 dpi/10). With different control resolutions as described above, when a gloss layer and a color material layer are overlappingly formed with each control resolution, an area representing the gloss characteristics and an area representing the color characteristics may overlap with each other in an unintended combination. Specifically, confirming the area of the color image data (c2) corresponding to the area 605 of the image data (g2) illustrated in FIG. 6, the area 601 is included in addition to the area 603, as illustrated in image data (o2) illustrated in FIG. 6. In the area of the image data (c2), when viewed from the direction of 90 degrees, the color of the area 601 is strongly perceived and recognized as unintended noise in the input image data. As described above, such noise arises since the conventional technique does not take into consideration the difference in control resolution between the input color and gloss characteristics in the resolution conversion processing. According to the present exemplary embodiment, with reference to the gloss image data, color image data (c3) illustrated in FIG. 6 is generated by extracting a partial area corresponding to the boundary area of the gloss image data from the color image data and applying the resolution conversion processing to the area again. Referring to image data (e2) illustrated in FIG. 6, an example of a processing target boundary area is illustrated as black grids 606. This enables preventing noise occurrence in the boundary area. Since the resolution conversion processing is applied only to a partial area corresponding to the boundary area of the gloss image data, the high color characteristics control resolution can be maintained in a non-boundary area having the same gloss characteristics. The output image data generated via the processing performed in the present exemplary embodiment refers to the color ink dot arrangement data converted from the example color image data (c3) illustrated in FIG. 6 and to the shape data converted from the example gloss image data (g2) illustrated in FIG. 6. A series of processing content of the image processing apparatus 1 which generates the output image data for controlling the above-described noise occurrence will be described below.

<Processing Content of Image Processing Apparatus 1>

Figure 7A:
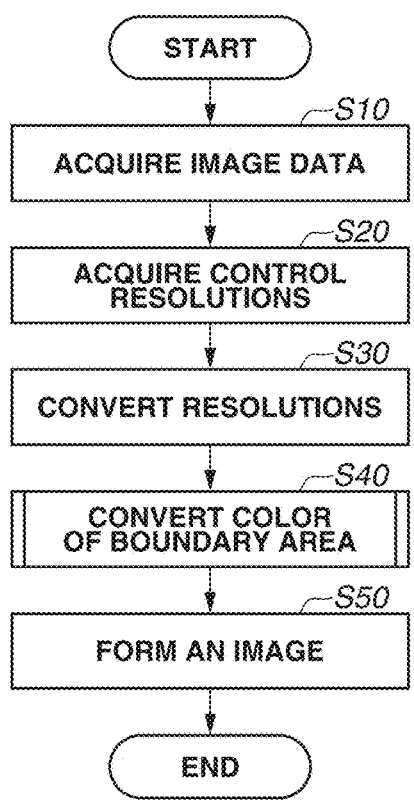
FIGS. 7A and 7B are flowcharts illustrating processing of the image processing apparatus according to one or more aspects of the present disclosure.
Figure 7B:
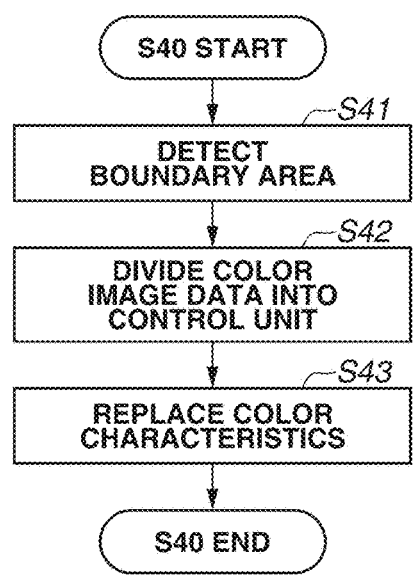

FIGS. 7A and 7B are flowcharts illustrating processing content of the image processing apparatus 1 according to the present exemplary embodiment. Processing content of the image processing apparatus 1 according to the present exemplary embodiment will be described in detail below with reference to FIGS. 7A and 7B. Processing in flowcharts (described below) illustrated in FIGS. 7A and 7B is implemented when the CPU 101 loads a program code stored in the ROM 102 into the RAM 103 and then executes it. The flowcharts illustrated in FIGS. 7A and 7B are started when the user operates the input devices 12 to input an instruction and the CPU 101 receives the input instruction. Each step (process) number is preceded by letter "S".

In step S10, the first acquisition unit 201 acquires two different types of image data. Data is assumed to have been pre-recorded in a predetermined storage device such as the HDD 15. Image data refers to the color image data (c1) which records the pixel values corresponding to the color characteristics, and the gloss image data (g1) which records the pixel values corresponding to the gloss characteristics described with reference to FIG. 6. According to the present exemplary embodiment, the color image data (c1) as illustrated in FIG. 6 has three different channels corresponding to R, G, and B. A 8-bit value (0 to 255) is stored in each pixel for each channel. The gloss image data (g1) illustrated in FIG. 6 is a gray scale image for one channel. The value corresponding to an azimuth angle from 0 to 180 degrees providing the maximum reflective intensity of light is normalized to an 8-bit value (0 to 255) and recorded in each pixel. For example, a digital camera is disposed at the position corresponding to the observer 502 illustrated in FIGS. 5A and 5B and a reproduction target is disposed at the position corresponding to the print product 4. The above-described two different types of image data can be generated by using the RGB image obtained by capturing an image of the reproduction target with the digital camera. Specifically, the CPU 101 performs positioning of two RGB images captured with varying azimuth angle through known feature point extraction and projection conversion processing, calculates average RGB values for each pixel, and inputs as color image data the RGB images with the average RGB values recorded therein. Then, after performing positioning of the two RGB images, the CPU 101 compares between the G values of the two RGB image data, sets the value of the azimuth angle when the RGB image having a larger G value has been captured, as the gloss characteristic value, and sets the image data in which the gloss characteristic value is recorded, as the gloss image data. The above-described input image data may be generated not by using an imaging apparatus but by using a commercial or freeware image editing software. Although the G value is used as the reflective intensity when generating the gloss image data (luminance value), the average RGB values may be used as the luminance value for comparison. The input image data may be in different formats. For example, as long as the color image data is information indicating the color characteristics convertible into the amount of CMYK color ink (recording amount of color ink) mounted on the printer, the color image data may be CIEXYZ values instead of the RGB values, or the amount of color ink may be directly recorded. In the gloss image data, not only the azimuth angle providing the maximum reflective intensity of light but also the specular glossiness indicating the intensity of the reflected light at the azimuth angle may be recorded in different channels. As long as uneven shapes formed in the gloss layer can be identified, the azimuth angle to be recorded in each pixel of the gloss image data does not need to be the azimuth angle providing the maximum reflective intensity of light. For example, the azimuth angle to be recorded may be the azimuth angle providing the minimum reflective intensity of light.

In step S20, the second acquisition unit 202 acquires the resolution used by the printer 13 to control the color and the gloss characteristics recorded in the color and the gloss image data, respectively, acquired in step S10. The resolution is assumed to be prestored in the storage unit 206. According to the present exemplary embodiment, it is assumed that the printer 13 is capable of controlling the ink discharge ON/OFF state with a resolution of 1200 dpi and controlling fine uneven shapes for controlling the gloss characteristics based on 10×10 pixel blocks with the 1200 dpi resolution of the printer 13. In this case, the storage unit 206 stores a color characteristic control resolution of 1200 dpi and a gloss characteristic control resolution of 120 dpi. The gloss characteristics are associated with uneven shapes and are converted into the shape data representing the dot arrangements and the number of stacked layers of the clear ink which forms the uneven shapes. An image is formed by operations of the above-described printer 13. A look-up table (LUT) as illustrated in FIG. 8 usable for the conversion is assumed to be prestored in the storage unit 206. The overview of the LUT will be described below with reference to FIG. 8. Referring to FIG. 8, a column 801 indicates a gloss characteristic value (azimuth angle) recorded on the pixel value of the gloss image data. A column 802 indicates dot arrangements of the clear ink for forming uneven shapes for reproducing the gloss characteristics represented by the gloss image data on a recording medium. Black and white grids schematically illustrate pixels corresponding to the ink discharge ON and OFF states, respectively. A column 803 indicates the number of clear ink layers to be stacked on pixels corresponding to black. Referring to such a LUT, the CPU 101 searches for, in the column 801, a value which coincides with the gloss characteristic value recorded in each pixel of the input gloss image data. Acquiring the dot arrangements and the number of stacked layers (shape data) of the clear ink corresponding to the searched row enables obtaining information to form a gloss layer. The conversion processing based on the LUT is performed by the formation control unit 205 together with the color separation processing, a known HT processing, and the path decomposition processing on the color image data for forming a color material layer.

In step S30, the first conversion unit 203 converts the resolutions of the two different types of image data acquired in step S10 into respective control resolutions acquired in step S20. Specifically, the first conversion unit 203 resamples the image by using a known interpolation processing method such as the bilinear method.

In step S40, referring to the gloss image data with which the resolutions have been converted in step S30, the second conversion unit 204 converts the resolution again for a partial area of the color image data with which the resolution has converted in step S30. Specifically, the second conversion unit 204 extracts pixels in the boundary area of the gloss image data, and resamples a pixel area in the color image data corresponding to the pixels to convert the color of the pixel area. The processing operation will be described in detail below.

In step S50, based on the gloss image data, the formation control unit 205 acquires the shape data for each gloss characteristic control unit, referring to the LUT illustrated in FIG. 8. Based on the shape data for each gloss characteristic control unit, the formation control unit 205 generates the output shape data (binary information indicating the discharge ON/OFF state and the number of stacked layers of the clear ink) to be output to the printer 13 to form a gloss layer. Then, based on the LUT stored in the storage unit 206, the formation control unit 205 converts the color image data into the ink amount data of the color ink. According to the present exemplary embodiment, the table associates the RGB values with the CMYK values. Then, the formation control unit 205 applies the known HT processing and path decomposition processing to the ink amount data to generate the color ink dot arrangement data (binary information indicating the discharge ON/OFF state of the color ink). Finally, based on the output shape data and the color ink dot arrangement data generated in this step, the formation control unit 205 instructs the printer 13 to form an image by overlapping a gloss layer and a color material layer. If data is related to the use of the color ink for the printer 13 to form a color material layer, a color material layer may be formed on the printer 13 based on any of the color ink amount data and the dot arrangement data.

Processing operations of the second conversion unit 204 (step S40) will be described in detail below with reference to FIG. 7B. According to the present exemplary embodiment, the data generated by the second conversion unit 204 refers to the image data (c3) obtained by resampling a partial area of the color image data with which the resolution has been converted in step S30 as illustrated in FIG. 6.

In step S41, the second conversion unit 204 detects the boundary area of the gloss image data. Specifically, the second conversion unit 204 applies the Laplacian filter processing to the gloss image data and binarizes the data with a predetermined threshold value to identify the boundary and the non-boundary areas. As the filter processing, other known edge detection processing using an unsharp mask or a Sobel filter is applicable. The image data (e2) illustrated in FIG. 6 schematically illustrates an example of a boundary area detected by applying the above-described filter processing to the image data (g2). The area formed of the black grids 606 is the boundary area detected in this processing. The second conversion unit 204 performs resampling by applying the processing in steps S42 to S43 to the color image data area corresponding to the boundary area.

In step S42, the second conversion unit 204 divides a partial area of the color image data into blocks with the block size corresponding to the gloss characteristic control unit. A partial area refers to the area corresponding to the boundary area in step S41. The block size refers to 10×10 pixels on the color image data equivalent to one pixel in a resolution of 120 dpi, which is the gloss characteristic control unit. Dividing the color image data provides a plurality of areas having the above-described block size.

In step S43, the second conversion unit 204 determines the RGB values indicating the color characteristics for each division block obtained in step S42. Specifically, the second conversion unit 204 selects one color from a plurality of colors included in 10×10 pixels in each division block obtained in step S42, and records the selected color in all of the pixels in the block (uniformly changes the color of all of the pixels in the block to the one color). To select the RGB values, the second conversion unit 204 acquires the gloss characteristic value corresponding to the processing target block from the gloss image data. Then, the second conversion unit 204 scans the inside of the non-boundary area to acquire at least one position (coordinates) where a gloss characteristic value similar to the acquired gloss characteristic value is recorded. To determine the similarity, the second conversion unit 204 uses a predetermined threshold value for the difference between two pixel values. More specifically, the second conversion unit 204 acquires the position (coordinates) of a pixel having a similar pixel value when the difference is equal to or smaller than the threshold value. When there is no pixel having a similar color characteristic value outside the boundary area, the second conversion unit 204 repetitively perform processing for updating the threshold value and determining the similarity based on the threshold value. Although, in the present exemplary embodiment, the threshold value is set to 50, any value can be set as the threshold value as long as the similarity can be determined. To update the threshold value, in the present exemplary embodiment, a plurality of prepared threshold values is sequentially acquired and applied. For example, there is prepared a plurality of threshold values, for example, 50, 55 (50+5 which is 10% of 50), 61 (55+6 which is about 10% of 55), and so on. When there is no similar pixel, the threshold value is sequentially updated in ascending order. However, the way of increasing the threshold value is not limited to adding 10% of the previous value to the previous value. A plurality of gradually increasing values may be recorded as threshold values. Then, when there exists a plurality of acquired coordinates, the second conversion unit 204 selects coordinates providing the minimum distance to the coordinates corresponding to the processing target block. Finally, the second conversion unit 204 acquires the average RGB values of 10×10 pixels on the color image data corresponding to the selected coordinates on the gloss image data, selects one color which is most similar to the RGB values out of the processing target block, and records the color in all of the pixels in the block. Thus, the pixel values of all of the pixels in the block are converted. To determine the similarity of the RGB values, for example, the Euclid distance on the RGB coordinates can be used. In addition, the RGB values are converted into CIE L*a*b* (CIELAB) values, and the color difference calculated from the LAB values may be used as an index of similarity. This processing is performed on all of the division blocks obtained in step S42.

As described above, the image processing apparatus 1 according to the present exemplary embodiment extracts and resamples a partial area of the color image data based on the gloss image data. This enables reducing image quality degradation due to the mismatching between the boundary between areas representing different gloss characteristics and the boundary between areas representing different color characteristics.

<Modifications>

Although, in the present exemplary embodiment, the gloss image data and color image data acquired by the first acquisition unit 201 are converted into control resolutions by the first conversion unit 203, the processing may not be applied. For example, when the image data converted into the control resolution is acquired by using image processing software in advance, a configuration that does not use the resolution conversion processing is applicable. Specifically, the first acquisition unit 201 determines whether each piece of image data coincides with the control resolution at the time of image data acquisition, and, when the image data does not coincide with the control resolution, notifies the fact, and ends the processing.

Although, in the present exemplary embodiment, a color material layer is stacked on a gloss layer formed on a recording medium, the color material layer may be first recorded on a recording medium and then the gloss layer is recorded on the color material layer.

Although, in the present exemplary embodiment, a color material layer and a gloss layer are formed by using an ink-jet method, other recording modes such as the electrophotographic method are also applicable.

Although, in the present exemplary embodiment, UV-curing clear ink is used as ink for controlling the gloss characteristics (glossy ink), the ink type is not limited thereto. For example, non-UV light-curing ink is also applicable. A gloss layer may be formed by using ink for controlling the reflective characteristics of light, such as silver ink and white ink. As a recording material, toner may be used instead of ink. Uneven shapes may be formed by using wood or metal.

Although, in the present exemplary embodiment, anisotropy is controlled as the gloss characteristics, the gloss characteristics are not limited to the above-described example. For example, a gloss layer having an area providing different glossiness according to area gradation of silver ink on a recording medium may be formed. When using a silver medium as a recording medium, it is necessary to control the gloss characteristics by area gradation of white ink. Further, a low gloss area may be formed by damaging the surface by using clear ink, and a high gloss area may be formed by smoothing the surface.

Although, in the present exemplary embodiment, the CPU 101 uses data in which the azimuth angle providing the maximum reflective intensity of light is recorded in each pixel, as the gloss image data, the gloss image data is not limited thereto as long as the data represents the gloss characteristics as a reproduction target. For example, the gloss image data may be data in which the luminance value, reflective intensity, and reflectance are recorded in each pixel, or data in which a parameter such as the bidirectional reflectance distribution function (BRDF) is recorded in each pixel.

Figure 11:
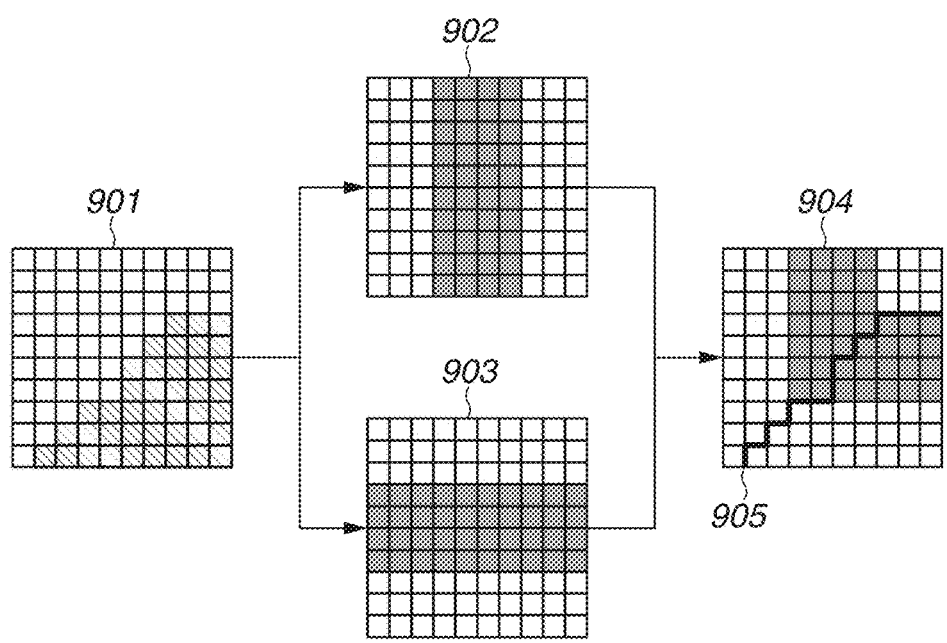
FIG. 11 illustrates an example of a result of combined shape data according to one or more aspects of the present disclosure.

Although, in the present exemplary embodiment, the CPU 101 acquires one type of shape data for each gloss characteristic control unit by using a LUT and generates output shape data based on the shape data, a plurality of types of shape data may be acquired for each gloss characteristic control unit by using a LUT. In this case, new shape data is generated by combining a plurality of types of acquired shape data, and output shape data is generated based on the generated shape data. An example of a method for combining shape data when a plurality of types of shape data is acquired for each gloss characteristic control unit is illustrated in FIG. 11. An area 901 refers to a gloss characteristic control unit in the gloss image data. The control unit includes two different types of areas, the shaded portion and the non-shaded portion, in which different gloss characteristic values are recorded. Image data 902 and 903 are the acquired two different types of shape data. Image data 904 is boundary shape data generated by combining two different types of shape data. A boundary line 905 indicates a boundary between areas having different gloss characteristics. When there is a boundary between areas representing different gloss characteristics in the gloss characteristic control unit in the gloss image data as illustrated in FIG. 11, i.e., when there is a plurality of types of gloss characteristics in the control unit, shape data corresponding to respective gloss characteristics is acquired by using a LUT. The shape data acquired according to the boundary in the control unit is combined. As an example of a method for combining shape data, new shape data can be generated by selecting pixel values of the shape data corresponding to the gloss characteristics recorded in each pixel of the gloss image data and then recording the pixel values in each pixel.

Although, in the present exemplary embodiment, the gloss characteristic control resolution is lower than the color characteristic control resolution, the color characteristic control resolution may be lower than the gloss characteristic control resolution. In this case, it is necessary is to partially exchange between the processing for the color characteristics (color image data) and the processing for the gloss characteristics in the above-described exemplary embodiment. More specifically, the gloss characteristics are unified to one type in the block including the boundary between areas having different gloss characteristics. In this way, the present exemplary embodiment is applicable as long as the gloss characteristic control resolution differs from the color characteristic control resolution. If both control resolutions are high, the CPU 101 performs processing for adjusting the characteristics having a higher control resolution to the characteristics having a lower control resolution.

Although, in the present exemplary embodiment, the CPU 101 performs processing for matching the gloss characteristic control unit with the color characteristic control unit only at the boundary between areas having different gloss characteristics, processing for matching the control unit (control resolution) over the entire gloss image data and the entire color image data may be performed. In this case, the CPU 101 selectively acquires the lower control resolution out of the color and the gloss characteristic control resolutions, and performs the resolution conversion processing based on the acquired control resolution. The CPU 101 may acquire one control resolution allowing the printer 13 to control the color and the gloss characteristics, from the storage unit 206, and perform the resolution conversion processing based on the acquired control resolution. Acquiring image data and control resolutions and performing resolution conversion in this way enable reducing image quality degradation due to the mismatching between the boundary between areas representing different gloss characteristics and the boundary between areas representing different color characteristics.

Although, in the present exemplary embodiment, the shape data is binary data representing the clear ink discharge ON/OFF state, the shape data is not limited thereto as long as the shape data represents uneven shapes formed on a recording medium. For example, the shape data may be data in which the value indicating the height from the reference surface is recorded in each pixel, or data in which the value indicating the normal direction of the uneven shape surface is recorded in each pixel. In this case, data related to the use of the clear ink is generated based on the shape data. Data related to the use of the clear ink may be, for example, binary data representing the clear ink discharge ON/OFF state, or data representing the recording amount of the clear ink for each area. A table for associating the shape data with the data related to the use of the clear ink is generated in advance. The data related to the use of the clear ink is generated by using the table prestored in the storage unit 206.

According to the first exemplary embodiment, resampling is performed on the area on the color image data corresponding to the boundary area in the gloss image data. A second exemplary embodiment will be described below centering on a configuration for presenting information about the area to the user before applying resampling, allowing the user to arbitrarily select whether to perform resampling of the color characteristics according to the first exemplary embodiment. When the input image data in which the above-described boundaries in the color and the gloss image data are intentionally deviated from each other is acquired, it is possible to prevent the intended vision represented by the mismatching from being reduced because the vision is misidentified as noise. The functional configuration of the image processing apparatus 1 according to the second exemplary embodiment is similar to the functional configuration according to the first exemplary embodiment, and a series of operation processing by the first acquisition unit 201 to the storage unit 206 is performed. Processing by the second conversion unit 204 different from that of the first exemplary embodiment (step S40) will be mainly described below.

<Processing Content of Image Processing Apparatus 1>

In steps S10 to S30, similar to the first exemplary embodiment, the second conversion unit 204 acquires the gloss and the color image data, the gloss and the color characteristic control resolutions, and performs the conversion of the resolution of each piece of image data. In step S40, the second conversion unit 204 detects a boundary area, determines whether to apply resampling, and performs resampling processing on the boundary area determined to be applied. The processing operation in this step will be described in detail below. In step S50, similar to the first exemplary embodiment, the second conversion unit 204 instructs the printer 13 to form a gloss layer and a color material layer based on the shape data and the color ink dot arrangement data.

Figure 9:
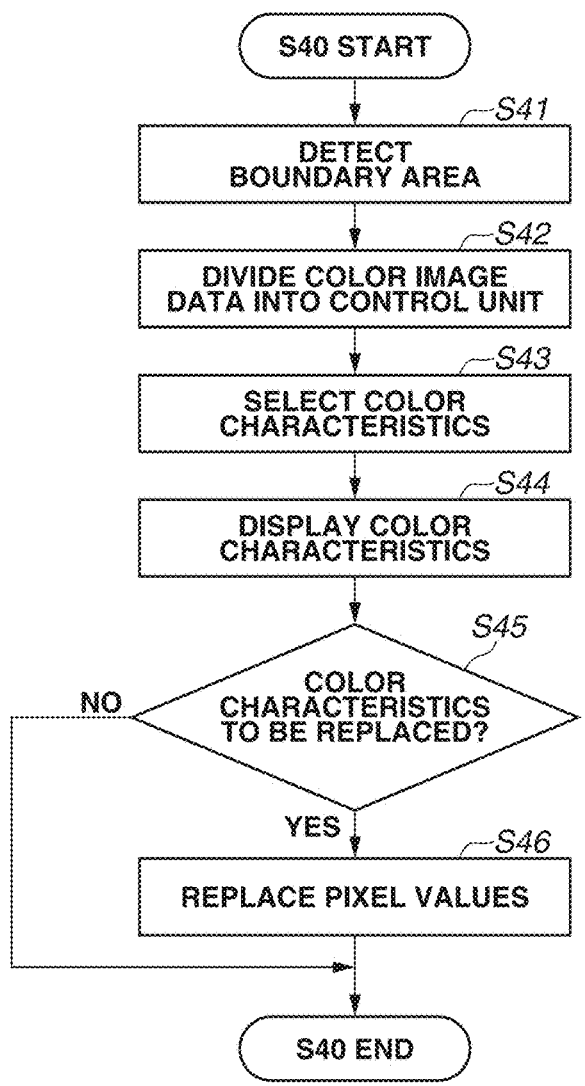
FIG. 9 is a flowchart illustrating processing of a second conversion unit according to one or more aspects of the present disclosure.

FIG. 9 is a flowchart illustrating the processing content of the second conversion unit 204 (step S40) according to the present exemplary embodiment.

Figure 10:
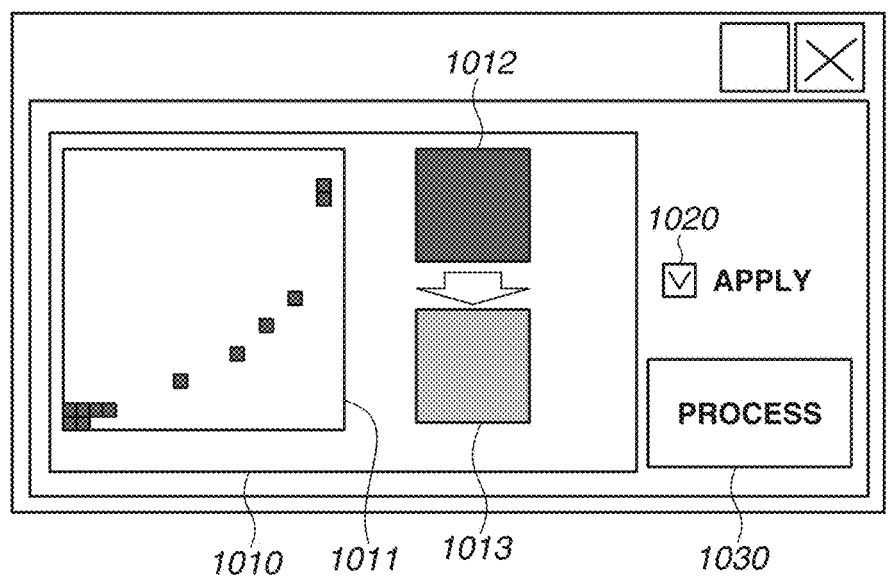
FIG. 10 illustrates an example of a user interface (UI) screen displayed on a display by the second conversion unit according to one or more aspects of the present disclosure.

In steps S41 to S43, similar to the first exemplary embodiment, the second conversion unit 204 detects a boundary area in the gloss image data and selects the block size after resampling and the color characteristics (RGB values) in the block. In step S44, the second conversion unit 204 presents the above-described boundary area and color characteristics to the user via the display 17. In step S45, the second conversion unit 204 receives via the input device 12 a user instruction for specifying whether to perform the resampling of the above-described boundary area. When the second conversion unit 204 determines to replace the color characteristics through resampling (YES in step S45), the processing proceeds to step S46. In step S46, the second conversion unit 204 records the color characteristics selected in step S43 in each block in the boundary area. On the other hand, when the second conversion unit 204 determines not to replace the color characteristics (NO in step S45), the processing exits this flowchart. In this case, the second conversion unit 204 skips the processing in step S46. When a plurality of boundary areas exists as a result of labelling of the detected boundary areas, the second conversion unit 204 may determine whether to separately perform resampling for each boundary area. FIG. 10 illustrates an example of a UI screen displayed to the user in step S44 and used to receive a user instruction in step S45, as described above. Referring to FIG. 10, a preview area 1010 displays the area where the color characteristics are to be replaced through resampling, and displays colors. A black area 1011 indicates an area where the color characteristics are to be replaced. An area 1012 indicates the color characteristics before the replacement. An area 1013 indicates the color characteristics after the replacement. A check box 1020 is used to identify whether to replace the color characteristics through resampling. When a button 1030 is pressed, the CPU 101 proceeds to the following processing according to the input of the check box 1020.

As described above, the image processing apparatus 1 according to the present exemplary embodiment presents information about the area to the user before applying resampling, allowing the user to arbitrarily select whether to perform resampling of the color characteristics according to the first exemplary embodiment. This enables preventing the intended vision produced by the mismatching between the boundary of the color image data and the boundary of the gloss image data from being reduced because the vision is misidentified as noise.

According to the present disclosure, it is possible to reduce image quality degradation due to the mismatching between the boundary between areas representing different gloss characteristics and the boundary between areas representing different color characteristics in an image formed by overlapping a color material layer and a gloss layer.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors and one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2016-211899, filed Oct. 28, 2016, and No. 2017-140764, filed Jul. 20, 2017, which are hereby incorporated by reference herein in their entirety.

What is claimed is:

1. An image processing apparatus for generating data for overlappingly forming a first image including a boundary between a plurality of areas representing different gloss characteristics and a second image having a plurality of areas including a plurality of pixels, on a recording medium, the apparatus comprising:
   at least one memory and at least one processor that function as:
   an acquisition unit configured to acquire first image data representing gloss characteristics of the first image and second image data representing color characteristics of the second image; and
   a conversion unit configured to convert colors represented by respective pixels of the areas in the second image into one color out of the colors represented by the respective pixels of the areas, based on the first image data,
   wherein the areas in the second image correspond to areas obtained by dividing the first image into a plurality of areas, and include a part of the area corresponding to the boundary in the second image.

2. The image processing apparatus according to claim 1, further comprising:
   a second acquisition unit configured to acquire shape data representing uneven shapes for reproducing the gloss characteristics represented by the first image data for each of the areas in the first image corresponding to the areas in the second image; and
   a generation unit configured to generate data related to a use of a first recording material for forming the uneven shapes on the recording medium based on the shape data, and generate data related to a use of a second recording material for recording a color represented by the second image data, based on the second image data.

3. The image processing apparatus according to claim 2, further comprising a third acquisition unit configured to acquire a table in which the gloss characteristics represented by the first image data are associated with the shape data, wherein the second acquisition unit acquires the shape data based on the table.

4. The image processing apparatus according to claim 2, wherein the data related to the use of the first recording material is data representing dot arrangements and the number of stacked layers of the first recording material on the recording medium.

5. The image processing apparatus according to claim 2, wherein the first recording material is light-curing clear ink.

6. The image processing apparatus according to claim 2, wherein, when the areas in the first image corresponding to the areas in the second image include a boundary between a plurality of areas representing different gloss characteristics, the second acquisition unit acquires a plurality of types of the shape data according to respective gloss characteristics,
   wherein the image processing apparatus further comprises a second generation unit configured to generate boundary shape data representing a shape to be reproduced at the boundary between the plurality of areas representing different gloss characteristics by combining the shapes represented by the plurality of types of the shape data, and
   wherein the generation unit generates data related to a use of the first recording material based on the shape data and the boundary shape data.

7. The image processing apparatus according to claim 1, wherein a recording material for reproducing the gloss characteristics represented by the first image data is silver ink or white ink, and
   wherein the image processing apparatus further comprises a generation unit configured to generate data related to a use of a recording material for recording the gloss characteristics represented by the first image data, based on the first image data.

8. The image processing apparatus according to claim 2, further comprising a formation unit configured to overlappingly form the first and the second images based on the data generated by the generation unit.

9. The image processing apparatus according to claim 1, further comprising a detection unit configured to detect the boundary in the first image.

10. The image processing apparatus according to claim 9, wherein the detection unit detects the boundary by using a Laplacian filter.

11. The image processing apparatus according to claim 9, wherein the detection unit detects the boundary by using an unsharp mask.

12. The image processing apparatus according to claim 9, wherein the detection unit detects the boundary by using a Sobel filter.

13. The image processing apparatus according to claim 1, further comprising an accepting unit configured to accept an instruction from a user indicating whether to perform conversion by the conversion unit for each of the areas in the second image, wherein, further based on the instruction from the user, the conversion unit converts the colors represented by respective pixels of the areas in the second image into one color out of the colors represented by the respective pixels of the areas.

14. An image processing apparatus for generating data for overlappingly forming a first image representing at least two different types of gloss characteristics of a reproduction target and a second image representing color characteristics of the reproduction target, on a recording medium, the apparatus comprising:
at least one memory and at least one processor that function as:
an acquisition unit configured to acquire first image data representing the first image and second image data representing the second image; and
a conversion unit configured to convert a resolution of the first image data and a resolution of the second image data into a lower resolution out of a first resolution to reproduce the gloss characteristics of the reproduction target and a second resolution to reproduce the color characteristics of the reproduction target.

15. The image processing apparatus according to claim 14, wherein the second resolution is lower than the first resolution.

16. An image processing method for generating data for overlappingly forming a first image including a boundary between a plurality of areas representing different gloss characteristics and a second image having a plurality of areas including a plurality of pixels, on a recording medium, the method comprising:
acquiring first image data representing gloss characteristics of the first image and second image data representing color characteristics of the second image; and
converting colors represented by respective pixels of the areas in the second image into one color out of the colors represented by respective pixels of the areas, based on the first image data,
wherein the areas in the second image correspond to areas obtained by dividing the first image into a plurality of areas, and include a part of the area corresponding to the boundary in the second image.

17. An image processing method for generating data for overlappingly forming a first image representing at least two different types of gloss characteristics of a reproduction target and a second image representing color characteristics of the reproduction target, on a recording medium, the method comprising:
acquiring first image data representing the first image and second image data representing the second image; and
converting a resolution of the first image data and a resolution of the second image data into a lower resolution out of a first resolution to reproduce the gloss characteristics of the reproduction target and a second resolution to reproduce the color characteristics of the reproduction target.

18. A non-transitory computer-readable storage medium storing instructions that, when executed by a computer, cause the computer to perform an image processing method for generating data for overlappingly forming a first image including a boundary between a plurality of areas representing different gloss characteristics and a second image having a plurality of areas including a plurality of pixels, on a recording medium, the method comprising:
acquiring first image data representing gloss characteristics of the first image and second image data representing color characteristics of the second image; and
converting colors represented by respective pixels of the areas in the second image into one color out of the colors represented by the respective pixels of the areas, based on the first image data,
wherein the areas in the second image correspond to areas obtained by dividing the first image into a plurality of areas, and include a part of the area corresponding to the boundary in the second image.

* * * * *